US005730255A

United States Patent [19]

Helmers

[11] Patent Number: 5,730,255

[45] Date of Patent: Mar. 24, 1998

[54] WALKER HAVING BRAKING SYSTEM

[76] Inventor: Kevin D. Helmers, 3410 Willie Way, Spring, Tex. 77380

[21] Appl. No.: 544,322

[22] Filed: Oct. 17, 1995

[51] Int. Cl.$^6$ .................... B62B 9/08

[52] U.S. Cl. .................... 188/19; 280/33.994

[58] Field of Search .................... 188/19, 20, 21, 188/22, 2 F, 353; 280/250.1, 657, 33.994, 87.05, 87.027; 298/118, DIG. 4, DIG. 10

[56] References Cited

U.S. PATENT DOCUMENTS

| | | | |
|---|---|---|---|
| 1,965,459 | 7/1934 | Fischer | 188/353 |
| 4,387,908 | 6/1983 | Kroger et al. | 188/19 |
| 4,392,663 | 7/1983 | Forslund | 188/19 |
| 5,370,408 | 12/1994 | Eagan | 280/33.994 |

OTHER PUBLICATIONS

Kent's Mechanical Engineers' Handbook, "External Gear Pump," p. 13–09, 1950.

Enrichments' "Aid Through Daily Living" catalog, pp. 154–156, date unknown but believed to be Jan. 1996.

Rubbermaid Health Care Products catalog, Carex walkers and accessories, pp. MA1, MA4–MA6, date unknown but believed to be Jan. 1996.

Winnie Walker Company, brochure entitled "Introducing Our Family of Wheeled Walkers," date unknown.

*Primary Examiner*—Matthew C. Graham

*Attorney, Agent, or Firm*—Vaden, Eickenroht & Thompson, L.L.P.

[57] ABSTRACT

The present invention relates to a wheeled carriage, particularly a walker, including a load-bearing frame having a plurality of wheels rotatably carried thereby for support and mobility thereof. The frame carries a hydraulic fluid reservoir, and a pair of pumps having inlet and outlet ports. The pumps draw fluid through their respective inlet ports from the reservoir and return fluid through their respective outlet ports to the reservoir. Conduit is also carried by the frame for fluid communication between the reservoir and the inlet and outlet ports of the pumps. The wheels are respectively connected to each of the pumps for operating the pumps in response to the rotation of the wheels. The frame further carries a valve in the conduit that is adapted to be opened or closed by the hand strength of the user. The closed position of the valve prevents movement of the hydraulic fluid from the outlet ports of the pumps to the reservoir whereby the connected wheels are prevented from rotating.

14 Claims, 4 Drawing Sheets

FIG.9A
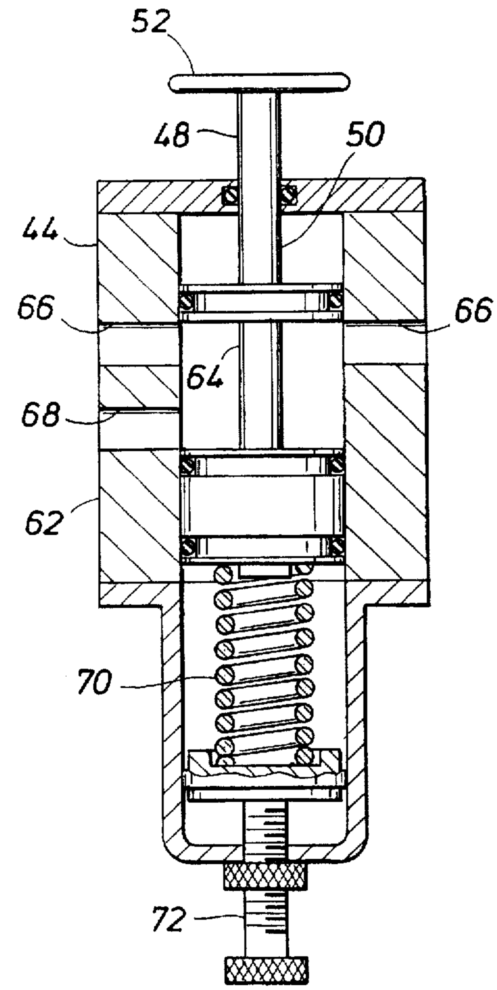
FIG.9B
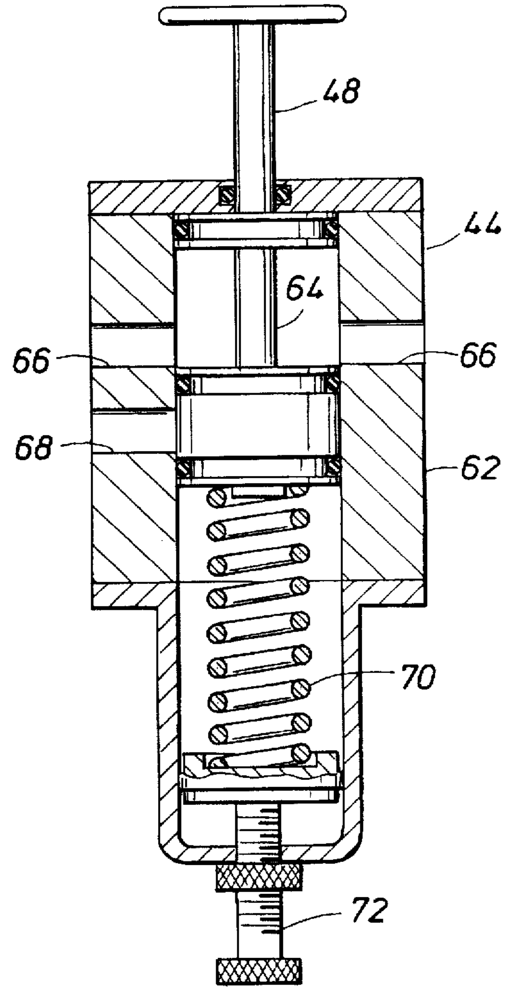
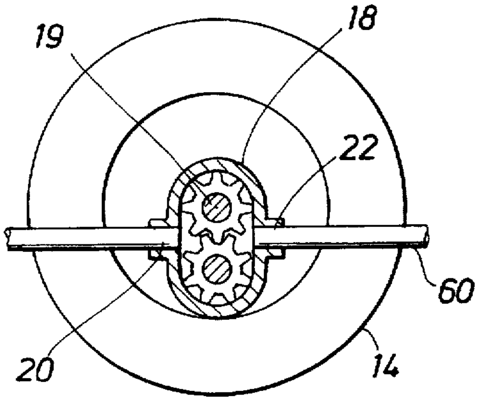
FIG.7
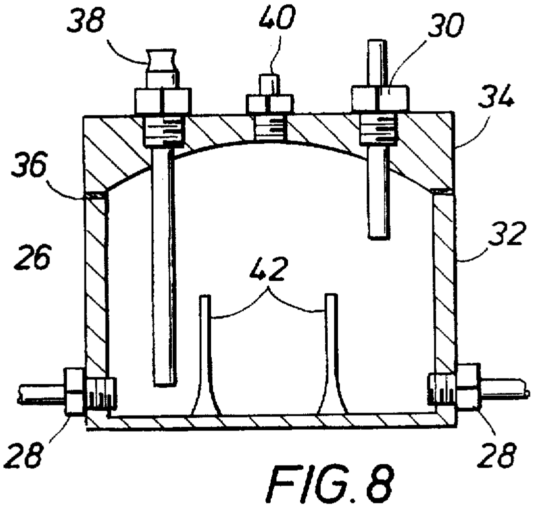
FIG.8

WALKER HAVING BRAKING SYSTEM

BACKGROUND OF THE INVENTION

1. Field of the Invention

The present invention relates generally to wheeled carriages, and specifically to wheeled walkers of the type designed for improving the mobility of the physically challenged and disabled.

2. Description of the Related Art

Typically, such walkers consist of a metal framework including handrails or handgrips, and are mounted on peg-like supports which are rubber coated to prevent sliding relative to the floor. The problem with such walkers is that they require lifting of some or all of the framework mass in order to advance, as the rubber coated pegs are not generally adapted for easy sliding.

Proposed solutions to this problem include the placement of wheels on at least two of the pegs to assist in mobility of the walker. In this development, the supports of the frame not mounted on wheels must still be lifted for movement with the walker, and the walker then tends to be unstable because only part of it is lifted. More importantly, the walker can slide away from the user causing loss of balance, falls, and potentially serious injury.

A further development in the field was the addition of handbrakes to the rails of the walker for controlling the rolling motion of the wheels on the frame. The brake system employs caliper handles, similar to those used on bicycles for actuating brake pads on the wheels of the walker. This system presents its own drawback, in that the users of such devices many times do not have the hand strength required to activate the brakes. Thus, in many cases individuals who are strong enough to move about with the aid of a walker are restricted to wheelchairs because of their inability to apply the aforementioned braking system.

The prior art thus lacks a walker which is adapted for assisting stepping movement of disabled individuals while at the same time providing an effective braking system, all being accomplished with minimum force and effort on the part of the user. It is therefore an object of the present invention to provide such a walker of this general type which overcomes the hereinbefore described problems as well as others.

SUMMARY OF THE INVENTION

The present invention relates to a wheeled carriage in the form of a walker comprising a load-bearing frame having a plurality of wheels rotatably carried thereby for support and mobility thereof. The frame carries a hydraulic fluid reservoir, and a pair of pumps having inlet and outlet ports. The pumps draw fluid through their respective inlet ports from the reservoir and return fluid through their respective outlet ports to the reservoir. Conduit is carried by the frame for fluid communication between the reservoir and the inlet and outlet ports of the pumps. Means are also provided connecting one of the wheels respectively to each of the pumps for operating the pumps in response to the rotation of the wheels. The frame further carries, in the conduit, a valve which is adapted to be opened or closed by the hand strength of the user. The closed position of the valve prevents movement of the hydraulic fluid from the outlet ports of the pumps to the reservoir whereby the connected wheels are prevented from rotating.

In a particular embodiment, the connecting means comprise sprockets carried respectively by the pumps and wheels and a chain engaging the teeth of the sprockets.

In a further embodiment, the walker of the present invention includes means for varying the force required to open or close the valve.

In a further embodiment, the pumps are rotary pumps.

In a further embodiment, the pumps are gear-type rotary pumps.

In a further embodiment, the walker of the present invention additionally comprises a manifold carried by the frame and adapted for combining the fluid discharged through the respective outlet ports of the pumps into a single stream for return to the reservoir.

In a further embodiment, the walker of the present invention additionally comprises a second valve carried by the frame downstream of the manifold in series with and similar to the first valve.

In a particular embodiment, the valves are normally opened.

In a further embodiment, the valves are normally closed.

In a still further embodiment, the pumps are carried respectively on the left and right sides of the frame. The valves are also carried respectively on the left and right sides of the frame and are connected in parallel in the conduit for respectively preventing movement of the fluid from the outlet ports of the left and right pumps to said reservoir whereby said connected wheels are independently prevented from rotating.

The structure of the present invention as well as other features, advantages, benefits and objects thereof over other designs known in the art may be better understood with reference to the detailed description which follows in conjunction with the drawings.

BRIEF DESCRIPTION OF THE DRAWINGS

In the drawings, wherein like reference characters are used through out to describe like parts:

FIG. 7 is a sectional view of a gear pump and rear wheel of a walker according to the present invention.

FIG. 8 is a sectional view of the hydraulic reservoir of a walker according to the present invention.

FIGS. 9A and 9B are schematic views of a spool valve and an actuator in open and closed positions respectively within a walker according to the present invention.

DETAILED DESCRIPTION OF THE PREFERRED EMBODIMENT

Figure 1:
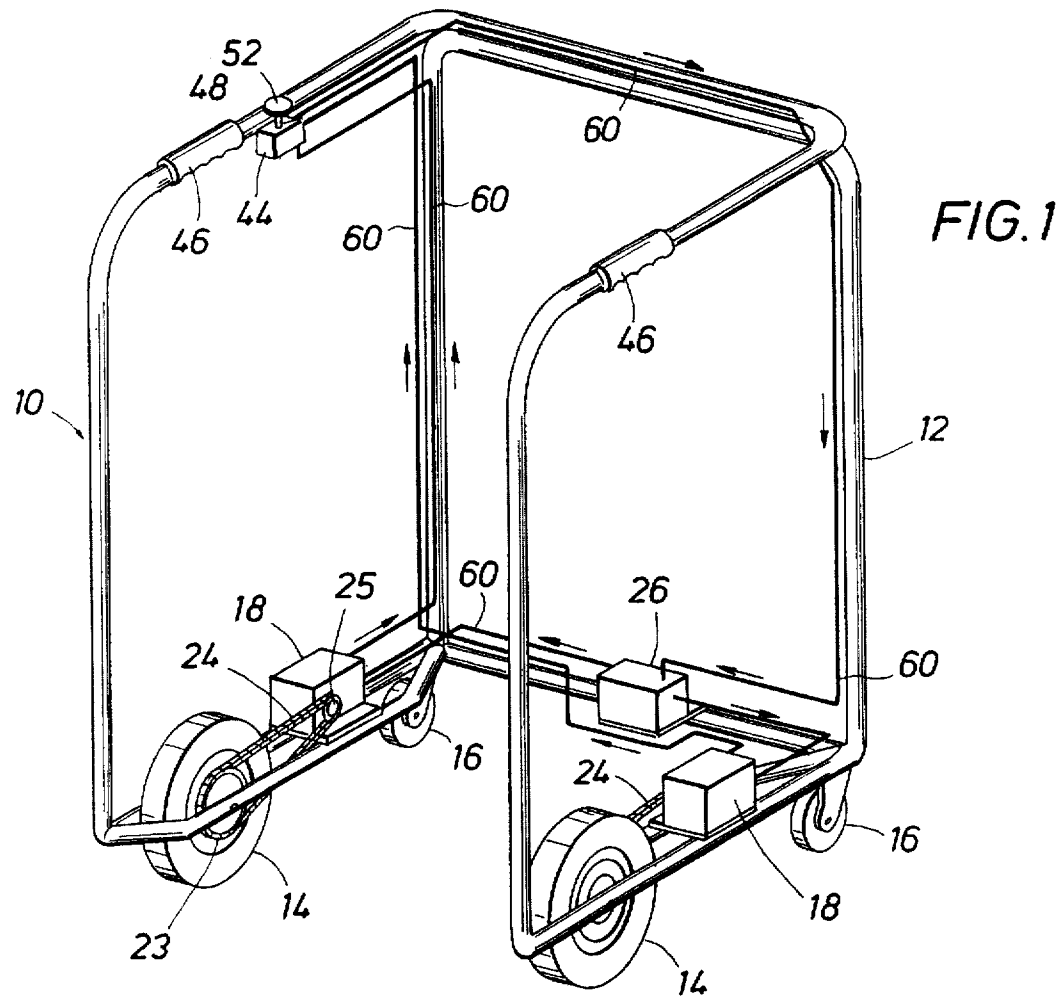
FIG. 1 is a schematic view of a walker according to the present invention equipped with one control valve for braking.

FIG. 1 depicts a preferred embodiment of a walker 10 according to the present invention. The walker 10 comprises a load-bearing frame 12 having a plurality of wheels 14, 16 rotatably carried thereby for support and mobility thereof. Movement of the walker 10 is enabled or disabled through rear wheels 14. Front wheels 16 give the walker 10 stability and freedom of movement in any direction. Thus the walker 10 may be moved forward, left, right, or turned 180 degrees around through its front wheels 16 if movement is enabled through its rear wheels 14.

The frame 12 carries a hydraulic fluid reservoir 26, and a pair of pumps 18 having inlet and outlet ports. As seen more particularly in FIG. 4, the pumps 18 draw fluid through their respective inlet ports 20 from the reservoir 26 and return fluid through their respective outlet ports 22 to the reservoir 26.

Conduit 60 is carried by the frame 12 for fluid communication between the reservoir 26 and the pumps 18. The outlet ports 28 of the reservoir 26 communicate with the respective inlet ports 20 of the pumps 18. The respective outlet ports 22 of the pumps 18 communicate through the conduit 60 with the inlet ports of a valve 44. The outlet port of the valve 44 similarly communicates with the inlet port 30 of the reservoir 26, completing a hydraulic fluid circuit. In operation, the rotation of the wheels 14 induced by the force of the user will drive the gear pumps 18 to circulate the fluid through the conduit 60 when the valves 44 are opened by actuators 48 (described further below).

As seen in FIG. 8, the reservoir 26 comprises a lower section 32 and a lid 34. The reservoir outlet ports 28 are positioned in lower section 32 and the inlet port 30 is positioned in the lid 34.

Reservoir 26 is filled by adding hydraulic fluid sufficient to top off lower section 32. A sealing gasket 36 is installed and lid 34 is then secured to the lower section 32. Lid 34 is also provided with a filling port 38 and vacuum port 40. A temporary fluid reservoir (not shown) is connected to filling port 38, and a vacuum source is connected to vacuum port 40. Filling port 38 is opened and a vacuum is applied to port 40, causing the air in reservoir 26 and conduit 60 to be evacuated and replaced by hydraulic fluid from the temporary reservoir. When all air in reservoir 26 and conduit 60 has been evacuated, filling port 38 and vacuum port 40 are closed. Flow of the hydraulic fluid through reservoir 26 is regulated by baffles 42.

Referring again to FIG. 1, means are also provided connecting one of the wheels 14 respectively to each of the pumps 18 for operating the pumps in response to the rotation of the rear wheels 14. In a particularly preferred embodiment of the walker 10, the torque transmitting means comprises sprockets 23, 25 carried respectively by the rear wheels 14 and the pumps 18, and a chain 24 engaging the teeth of the sprockets 23, 25.

It will be appreciated by those skilled in the art given the benefit of this disclosure that the chain/sprocket assembly described herein could be replaced with a rubber belt or other flexible means (not shown) capable of transmitting torque in cooperation with a system of pulleys or the like for driving gear pumps 18 from the rotation of engaged wheels 14.

A further embodiment (also not shown) for torque transmission comprises a system of gears enabling engagement of an output shaft attached to drive wheels 14 with one end of a rotating drive shaft, and an input shaft attached to pumps 18 with the other end of the drive shaft. Thus, rotation of wheels 14 would induce rotation of the pumps 18 through the cooperation of the drive shaft and gear systems.

A still further embodiment for torque transmission comprises placement of the pumps 18 on the respective shafts 19 of wheels 14, as shown in FIG. 7. In other words, pumps 18 are carried by the frame 12 such that the shafts 19 upon which the hubs of wheels 14 are respectively mounted also act as the power input shafts 19 for the pumps 18. This embodiment is illustrated in FIG. 7 showing one of the pumps 18 represented as a simple external gear pump within a rear "drive" wheel 14.

The walker frame 12 further carries a three-way valve 44 in the conduit 60 that is adapted to be opened or closed by the hand strength of the user. The closed position of the valve 44 prevents movement of the hydraulic fluid from the outlet ports 22 of the pumps 18 to the reservoir 26 whereby the connected wheels 14 are prevented from rotating. The valve 44 is positioned on an upper portion of the frame 12 in the vicinity of handgrips 46, and is particularly adapted for actuation by the user's thumb.

In a particularly preferred embodiment, valve 44 is a sliding-spool flow valve as depicted in FIGS. 9A and 9B, comprising valve body 62 and spool 64. Hydraulic fluid delivered from the outlet ports 22 of respective pumps 18 enters the inlet ports 66 of the valve body 62, and exits the valve 44 through outlet port 68 when the valve is opened as displayed in FIG. 9A. It will be apparent to those skilled in the art given the benefit of this disclosure that other control valves such as rotary-spool valves, simple rotary valves, water shut-off valves, or even gate valves, may be used with similar success.

The closed position of the valve 44, shown in FIG. 9B, prevents movement of the fluid from the outlet ports 22 of the pumps 18 to the reservoir 26 whereby the connected wheels 14 are prevented from rotating. In other words, the valve 44 provides braking force for the walker 10 through the application of a resistive load in the fluid stream which the pumps 18 cannot overcome. Because the pumps 18 are thus effectively locked up and unable to operate, the wheels 14 to which the pumps 18 are connected are also locked up. As a result, the walker 10 is freely movable when fluid is allowed to pass through the valve 44, but is prohibited from moving when the valve 44 is closed.

Figure 4:
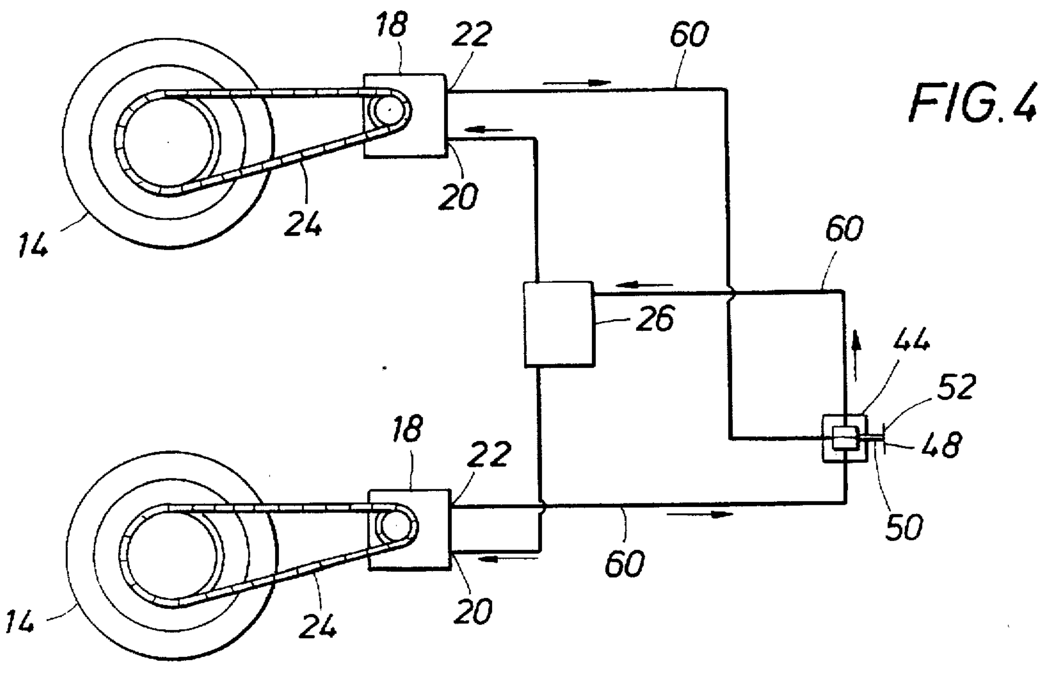
FIG. 4 is a schematic diagram of hydraulic fluid flow within a walker according to the present invention having one control valve.

An actuator 48, shown more particularly in FIGS. 4, 9A, and 9B is carried by the frame 12 for opening or closing the valve 44. The actuator 48 is a manually operated linear actuator having a stem 50 upon which a trigger 52 is mounted. The user applies force to the trigger 52 for urging the stem 50 to a position opening or closing the control valve 44.

In a particular embodiment, the walker 10 includes means for varying the force required to open or close the valve 44, comprising a coil spring 70 (or other yieldably urging means) within valve 44 whose compressive force is varied by a screw 72 adjustably set in the body 62 of valve 44 by the user of walker 10. Clockwise rotation of the set screw 72 will increase the compression in the coil spring 70, causing a corresponding increase in the amount of force required to open or close valve 44. Counter-clockwise rotation of the set screw 72 will lessen the amount of force required to open or close valve 44.

It will be apparent to those skilled in the art that other types of actuator mechanisms may be similarly applicable, such as a torque lever, particularly in the case of embodiments of the walker employing rotary control valves or the like. The actuator lever is adapted and positioned for ease of actuation by the user's thumb to apply braking force to the walker.

In a further embodiment, the pumps 18 utilized for moving the hydraulic fluid through the conduit 60 are rotary pumps. Those skilled in the art will recognize that "rotary pumps"includes vane pumps, oscillating-piston or eccentric pumps, gear pumps, screw pumps, radial plunger pumps, swash-plate pumps, as well as others.

In a further embodiment, the pumps 18 are gear-type rotary pumps. Gear pumps, particularly the aforementioned external gear pump of FIG. 7, are preferred for this embodiment due to the simplicity of their construction and ability to operate at low capacities and pressures.

In a further embodiment, the walker 10 of the present invention additionally comprises a manifold 54 carried by the frame 12 and adapted for combining the fluid discharged through the respective outlet ports 22 of the pumps 18 into a single stream for return to the reservoir 26. In this manner the fluid streams discharged from the respective pumps 18 are combined enabling the use of a two-way valve or valves 44 for preventing movement of the walker 10.

Figure 2:
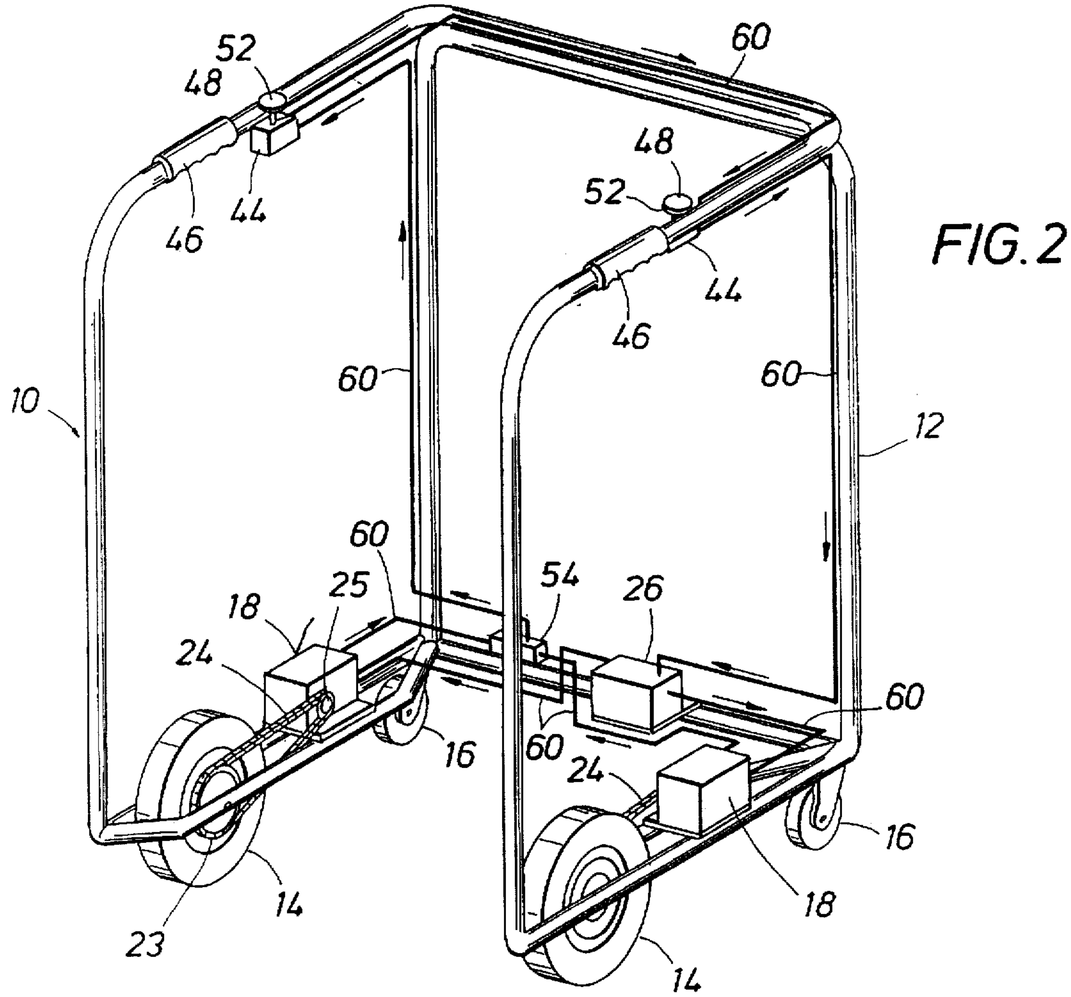
FIG. 2 is a schematic view of a walker according to the present invention equipped with two control valves in series.
Figure 5:
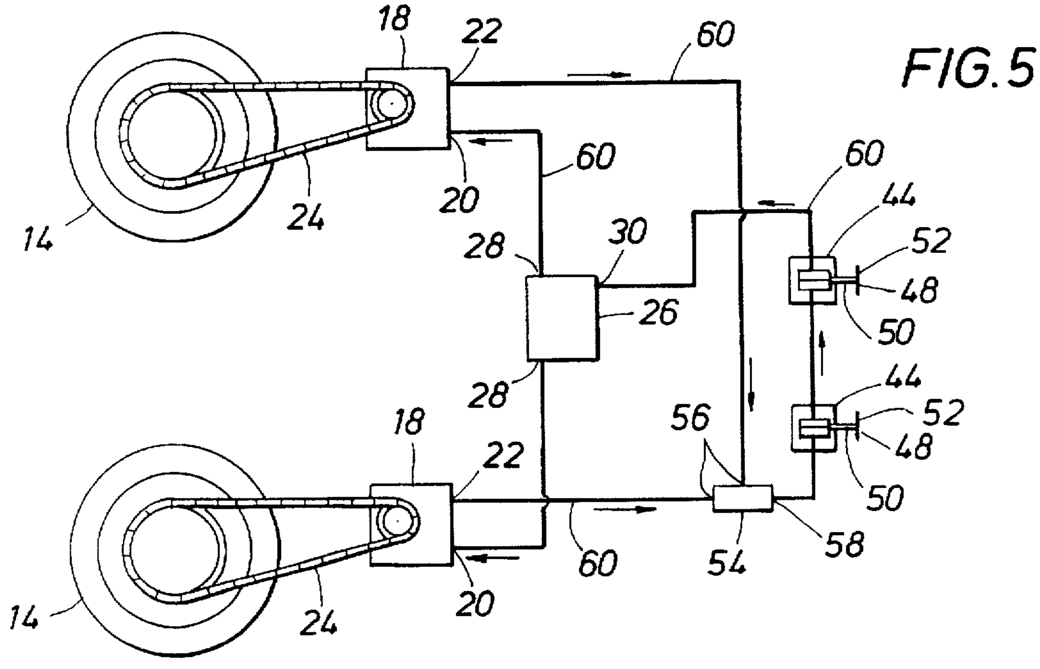
FIG. 5 is a schematic diagram of hydraulic fluid flow within a walker according to the present invention having two control valves carried in series.

In a further embodiment illustrated in FIGS. 2 and 5, the walker 10 of the present invention additionally comprises a second valve 44 carried by the frame 12 downstream of the manifold 54 in series with and similar to the first valve. As with the first valve 44, the closed position of the second valve 44 prevents movement of the fluid from the respective outlet ports 22 of the pumps 18 to the reservoir 26 whereby the engaged wheels 14 are prevented from rotating. Thus, the valves 44 are carried respectively in the vicinities of the left and right handgrips of the frame 12.

Here, the outlet ports 28 of reservoir 26 communicate through the conduit 60 with the respective inlet ports 20 of the pumps 18. The respective outlet ports 22 of the pumps 18 communicate through the conduit 60 with the inlet ports 56 of manifold 54. The outlet port 58 of manifold 54 also communicate through conduit 60 with the valves 44 in series. The downstream valve 44 then communicates with the inlet port 30 of the reservoir 26, completing the hydraulic fluid circuit.

The second valve 44 provides redundancy and essentially acts as a backup for creating a braking load in the hydraulic fluid. This valve also provides the user with the choice of activating either left or right side actuating triggers 52, as either of the respective valves will provide a load exceeding the combined discharge pressures of pumps 18 emanating from manifold 54. Of course, the user could activate both valve actuators 48 via the respective triggers 52 to brake the walker 10 as well.

In one embodiment, the actuators 48 of valves 44 also include means, such as a coil spring 70, yieldably urging the stems 50 to positions opening the control valves 44. The valves 44 are therefore normally opened in their fail-safe positions, and closed while the user applies the requisite amount of force to the respective triggers 52.

In an alternative embodiment of the walker 10, the actuating mechanisms 48 comprise similar means, yieldably urging the stems 50 to positions closing valves 44. The valves 44 are thus normally closed in their fail-safe positions of this embodiment, and opened while the user applies the requisite amount of force to the respective triggers 52. This embodiment is displayed in FIGS. 9A and 9B for a three-way valve 44, which is easily converted to a two-way valve by plugging one of the inlet ports 66.

Figure 3:
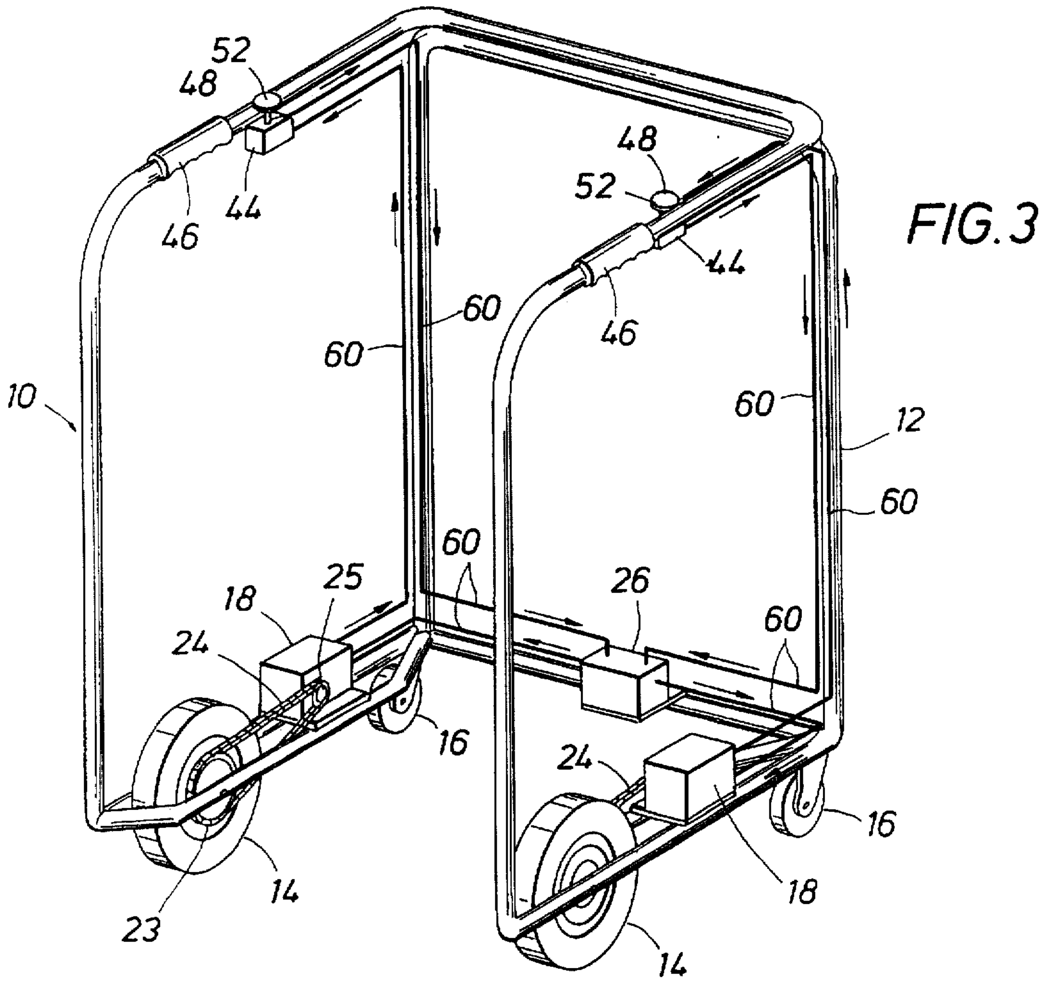
FIG. 3 is a schematic view of a walker according to the present invention equipped with two control valves in parallel.
Figure 6:
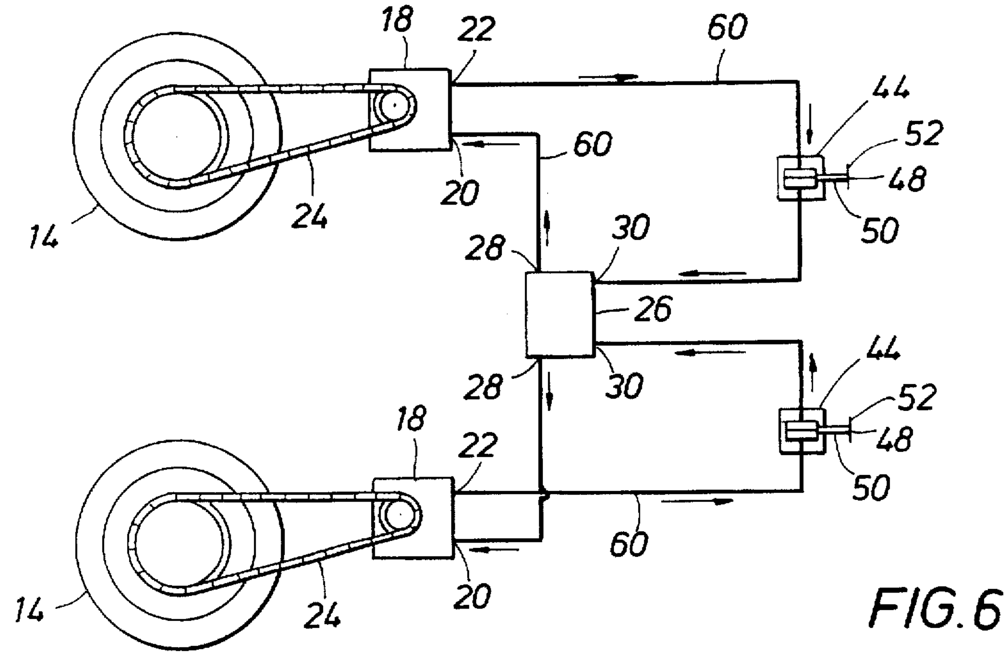
FIG. 6 is a schematic diagram of hydraulic fluid flow within a walker according to the present invention having two control valves carried in parallel.

In a still further embodiment illustrated in FIGS. 3 and 6, the pumps 18 are carried respectively on the left and right sides of the frame 12. The valves 44 are also carried respectively on the left and right sides of the frame 12 and are connected in parallel in the conduit 60 for respectively preventing movement of the fluid from the outlet ports 22 of the left and right pumps 18 to said reservoir 26 whereby said connected wheels 14 are independently prevented from rotating.

Thus, in this embodiment the walker 10 is equipped with two hydraulic flow circuits sharing a common reservoir 26. As such, the walker 10 is capable of independent braking control of the left or right side wheels 14 from the respective left or right side valves 44. This feature will facilitate increased control when turning the walker 10. The application of braking force to one of the rear wheels 14 will result in a stationary point about which the other side of walker 10 may be easily pivoted.

From the foregoing it will be seen that this invention is well adapted to attain all the ends and objects herein set forth, together with other advantages which are obvious and inherent to the walker 10.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as being illustrative and not in a limiting sense.

For example, in an alternative embodiment of the present invention, the embodied structure may be applied to wheeled carriages other than walkers, such as supermarket grocery carts or baby carriages (neither of which is shown). Each of these wheeled carriages includes a load-bearing frame that is suitable for carrying hydraulic fluid conduit, small pumps, and valve systems in accordance with the present invention. Thus, the present invention could be utilized to prevent the occurrence of "runaway" grocery carts in parking lots, and serve as a fail-safe braking system for baby carriages and strollers.

What is claimed is:

1. A walker comprising:

a load-bearing frame having a plurality of wheels rotatably carried thereby for support and mobility thereof, said frame including a pair of transversely spaced elongated members oriented horizontally and disposed above the wheels for placement on the elongated members by the hands of a physically disabled person to support the weight of the person while walking;

conduit carried by said frame for storing and moving hydraulic fluid;

a pair of pumps carried by said frame and having inlet and outlet ports, said pumps drawing fluid through their respective inlet ports from said conduit and returning fluid through their respective outlet ports to said conduit;

means connecting one of said wheels respectively to each of said pumps for operating said pumps in response to the rotation of said wheels;

a valve carried by said frame in said conduit and including means for yieldably urging said valve to one of opened and closed positions, the closed position of said valve preventing movement of the fluid from the outlet ports of said pumps whereby the connected wheels are prevented from rotating; and actuator means connected to one of the elongated members of said frame for moving said valve to the other of the opened and closed positions by the hand strength of the physically disabled person, whereby the physically disabled person can easily control the movement of the walker.

2. The walker of claim 1 wherein said connecting means comprises sprockets carried respectively by the connected pumps and wheels and a chain engaging the teeth of said sprockets.

3. The walker of claim 1 including means for varying the force required to open or close said valve.

4. The walker of claim 1 wherein said pumps are rotary gear pumps.

5. The walker of claim 1 further including a hydraulic fluid reservoir for bleeding air from said conduit.

6. The walker of claim 5 additionally comprising a manifold carried by said frame and adapted for combining the fluid discharged through the respective outlet ports of said pumps into a single stream for return to said reservoir.

7. The walker of claim 6 additionally comprising a second valve including means for yieldably urging the second valve to one of opened and closed positions, the second valve being carried by said frame downstream of said manifold in series with said first valve, the closed position of said valve preventing movement of the fluid from the respective outlet ports of said pumps to said reservoir whereby said engaged wheels are prevented from rotating, and a second actuator means connected to the other of the elongated members for moving the second valve to the other of opened and closed positions by the hand strength of the physically disabled person.

8. The walker of claim 7 wherein said valves are normally urged to an opened position.

9. The walker of claim 7 wherein said valves are normally urged to a closed position.

10. The walker of claim 7 including means for varying the actuator forces required to open or close said valves.

11. A walker comprising:

a load-bearing frame having a plurality of wheels rotatably carried thereby for support and mobility thereof, said frame including a pair of transversely spaced elongated members oriented horizontally and disposed above the wheels for placement on the elongated members by the hands of a physically disabled person to support the weight of the person while walking;

a hydraulic fluid reservoir carried by said frame;

a pair of pumps carried respectively on the left and right sides of said frame and having inlet and outlet ports, said pumps drawing fluid through their respective inlet ports from said reservoir and returning fluid through their respective outlet ports to said reservoir;

conduit carried by said frame for fluid communication between said reservoir and the inlet and outlet ports of said pumps;

means connecting one of said wheels respectively to each of said pumps for operating said pumps in response to the rotation of said wheels;

a pair of valves carried respectively on the left and right sides of said frame and connected in parallel in said conduit, each of said valves including means for yieldably urging said valves to one of opened and closed positions, the closed positions of said left and right valves respectively preventing movement of the fluid from the outlet ports of said left and right pumps to said reservoir whereby said connected wheels are independently prevented from rotating; and a pair of actuator means connected to the elongated members of said frame for moving said respective valves to the other of the opened and closed positions by the hand strength of the physically disabled person, whereby the physically disabled person can easily control the movement of the walker.

12. The walker of claim 11 wherein said connecting means comprises sprockets carried respectively by said pumps and wheels and a chain engaging the teeth of said sprockets.

13. The walker of claim 11 including means for varying the actuator forces required to open or close said valves.

14. A wheeled carriage having an automatic braking system, comprising:

a load-bearing frame having a plurality of wheels rotatably carried thereby for support and mobility thereof;

conduit carried by said frame for storing and moving hydraulic fluid;

a pair of pumps carried by said frame and having inlet and outlet ports, said pumps drawing fluid through their respective inlet ports from said conduit and returning fluid through their respective outlet ports to said conduit;

means connecting one of said wheels respectively to each of said pumps for operating said pumps in response to the rotation of said wheels;

a valve carried by said frame in said conduit and having actuating means operable by the hand strength of the user to open said valve, and means for closing said valve when the user releases the actuating means, the closed position of said valve preventing movement of the fluid from the outlet ports of said pumps whereby the connected wheels are prevented from rotating.

* * * * *